United States Patent
Katukam et al.

(10) Patent No.: US 12,075,382 B2
(45) Date of Patent: Aug. 27, 2024

(54) METHODS AND SYSTEMS FOR LOCATION BASED NETWORK SERVICE DEPLOYMENT

(71) Applicant: Nile Global, Inc., Cupertino, CA (US)

(72) Inventors: Suresh Katukam, Milpitas, CA (US); Steve Alexander, Woodside, CA (US); Vijay Bollapragada, Bangalore (IN); Promode Nedungadi, San Jose, CA (US); Arun Madupu, Bangalore (IN)

(73) Assignee: Nile Global, Inc., San Jose, CA (US)

( * ) Notice: Subject to any disclaimer, the term of this patent is extended or adjusted under 35 U.S.C. 154(b) by 134 days.

(21) Appl. No.: 17/134,032

(22) Filed: Dec. 24, 2020

(65) Prior Publication Data

US 2022/0210759 A1  Jun. 30, 2022

(51) Int. Cl.
| | | |
|---|---|---|
| *H04W 76/00* | (2018.01) | |
| *G06K 7/14* | (2006.01) | |
| *H04L 41/22* | (2022.01) | |
| *H04L 41/5041* | (2022.01) | |
| *H04L 67/10* | (2022.01) | |
| *H04L 67/52* | (2022.01) | |
| *H04W 4/029* | (2018.01) | |
| *H04W 8/22* | (2009.01) | |
| *H04W 64/00* | (2009.01) | |

(52) U.S. Cl.
CPC ........ *H04W 64/003* (2013.01); *G06K 7/1417* (2013.01); *H04L 41/22* (2013.01); *H04L 41/5041* (2013.01); *H04L 67/10* (2013.01); *H04L 67/52* (2022.05); *H04W 4/029* (2018.02); *H04W 8/22* (2013.01)

(58) Field of Classification Search
CPC ..... H04W 64/003; H04W 4/029; H04W 8/22; H04L 67/52; H04L 41/22; H04L 41/5041; H04L 67/10; G06K 7/1417
See application file for complete search history.

(56) References Cited

U.S. PATENT DOCUMENTS

| | | | |
|---|---|---|---|
| 6,938,089 B1 * | 8/2005 | Slaby | H04L 67/025 |
| | | | 713/1 |
| 8,887,262 B1 | 11/2014 | Turner et al. | |
| 9,173,115 B2 | 10/2015 | Sundareswaran et al. | |
| 9,369,869 B2 * | 6/2016 | Uetabira | H04W 12/084 |
| 9,769,734 B2 | 9/2017 | Goto | |
| 2012/0096107 A1 * | 4/2012 | Hatanaka | H04L 41/00 |
| | | | 709/213 |
| 2012/0100861 A1 * | 4/2012 | Zhang | H04W 24/00 |
| | | | 455/444 |
| 2014/0122674 A1 | 5/2014 | Gray et al. | |

(Continued)

OTHER PUBLICATIONS

Non-Final Office Action, U.S. Appl. No. 17/134,034 dated Mar. 18, 2021, 11 pgs.

*Primary Examiner* — Dai Phuong
(74) *Attorney, Agent, or Firm* — LOZA & LOZA, LLP

(57) ABSTRACT

Embodiments of a device and method are disclosed. In an embodiment, a method of network device deployment involves receiving an installation job at a mobile application of an installer device, using the mobile application, scanning a code of a network device at a customer location to obtain network device information, and sending the network device information and location information of the network device at the customer location to a cloud server for location specific configuration of the network device.

8 Claims, 14 Drawing Sheets

(56) References Cited

U.S. PATENT DOCUMENTS

| | | | |
|---|---|---|---|
| 2014/0278281 A1 | 9/2014 | Vaynriber et al. | |
| 2015/0067136 A1* | 3/2015 | Chang | H04W 16/18 |
| | | | 709/224 |
| 2015/0172118 A1 | 6/2015 | Lin | |
| 2016/0094387 A1* | 3/2016 | Stephenson | H04W 92/12 |
| | | | 709/222 |
| 2016/0337945 A1 | 11/2016 | Watt et al. | |
| 2017/0150322 A1* | 5/2017 | Gorajala Chandra | |
| | | | H04W 4/029 |
| 2017/0339144 A1* | 11/2017 | Han | H04L 9/3268 |
| 2017/0374560 A1 | 12/2017 | Judge et al. | |
| 2018/0120973 A1 | 5/2018 | Tiwari et al. | |
| 2018/0260807 A1 | 9/2018 | Yang et al. | |
| 2019/0272771 A1* | 9/2019 | Shionozaki | G09B 19/00 |
| 2019/0313255 A1* | 10/2019 | Ogita | H04W 12/73 |
| 2020/0067767 A1 | 2/2020 | Parangattil et al. | |
| 2021/0144150 A1* | 5/2021 | James | H04W 12/08 |
| 2022/0174244 A1* | 6/2022 | Guibene | G06V 20/52 |

* cited by examiner

METHODS AND SYSTEMS FOR LOCATION BASED NETWORK SERVICE DEPLOYMENT

BACKGROUND

Location specific services are commonly used in communications networks, for example, in enterprise networks, to provide services to different network devices. Providing location specific services to network devices typically requires various information associated with the locations of the network devices, such as, customer names of the network devices, site information of the network devices, building information of the network devices, floor information of the network devices, and/or a specific location on a floor of the network devices. However, typical location specific service technology requires manual inputting of location information of a network device to provide a location based service to the network device. In addition, typical location specific service technology uses a pre-defined configuration of a network device that is stored in a database prior to shipping the network device to a customer site to provide a location based service to the network device. Therefore, there is a need for location specific service technology that can automatically associate location information of a network device with a related configuration for providing desired location based services to the network device.

SUMMARY

Embodiments of a method and system for location based service are disclosed. In an embodiment, a method for network device deployment involves receiving an installation job at a mobile application of an installer device, using the mobile application, scanning a code of a network device at a customer location to obtain network device information, and sending the network device information and location information of the network device at the customer location to a cloud server for location specific configuration of the network device. Other embodiments are also described.

In an embodiment, the code of the network device includes a two-dimensional (2D) barcode on a surface of the network device or on a packaging of the network device.

In an embodiment, the 2D barcode on the network device includes a Quick Response (QR) code on the network device.

In an embodiment, the QR code on the network device contains at least one of a serial number of the network device, a device type of the network device, and media access control (MAC) address information of the network device.

In an embodiment, the network device information is not stored at a database of the cloud server prior to scanning the code of the network device at the customer location.

In an embodiment, the installer device includes a mobile phone.

In an embodiment, the network device includes a wireless communications device that is compatible with a wireless local area network (WLAN) communications protocol.

In an embodiment, the wireless communications device includes a wireless access point (AP).

In an embodiment, the network device includes a wired communications device that is compatible with a wired local area network (LAN) communications protocol.

In an embodiment, a method for network device deployment involves assigning an installation job for deploying a network device at a customer location to an installer, receiving network device information and location information of the network device at the customer location from the installer, and performing location based device association based on the network device information and the location information of the network device.

In an embodiment, the method further includes transmitting information related to a customer and network device deployment information to a mobile application of an installer device of the installer.

In an embodiment, the network device information includes a MAC address and a serial number of the network device.

In an embodiment, the method further includes associating the network device with a database entry in a PD database.

In an embodiment, the database entry in the PD database includes device type information of the network device and a deployment topology of the network device.

In an embodiment, the network device information is not stored at a database prior to assigning the installation job for deploying the network device at the customer location to the installer.

In an embodiment, the network device includes a wireless communications device that is compatible with a WLAN communications protocol.

In an embodiment, the wireless communications device includes a wireless AP.

In an embodiment, the network device includes a wired communications device that is compatible with a wired LAN communications protocol.

In an embodiment, a system for network device deployment includes a device deployment module is configured to assign an installation job for deploying a network device at a customer location to an installer, receive network device information and location information of the network device at the customer location from the installer, and perform location based device association based on the network device information and the location information of the network device, and a deployment database connected to the device deployment module and configured to store a list of network devices to be deployed at a customer site and device type information and deployment topology information of the network devices.

In an embodiment, the device deployment module is further configured to transmit information related to a customer and network device deployment information to a mobile application of an installer device of the installer.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
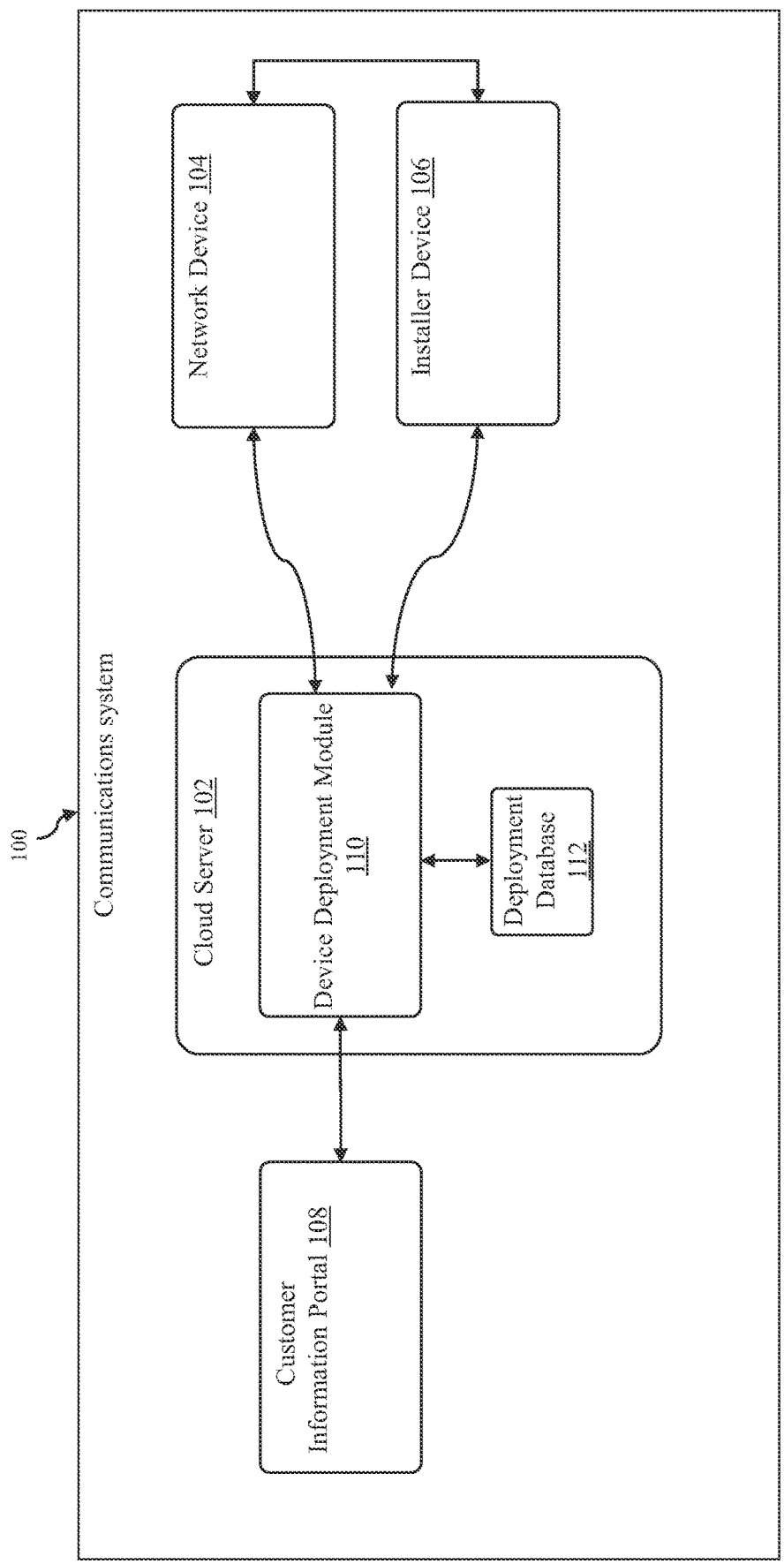
FIG. 1 depicts a communications system that can be used to provide location based services.

FIG. 1 depicts a communications system 100 that can be used to provide one or more location based services. In the embodiment depicted in FIG. 1, the communications system includes a cloud server 102, a network device 104, an installer device 106, and a customer information portal 108. The cloud server, the network device, the installer device, and/or the customer information portal may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one network device, more than one installer device, and/or more than one customer information portal. In another example, although the cloud server, the network device, the installer device, and the customer information portal are shown in FIG. 1 as being connected in certain topology, the network topology of the communications system 100 is not limited to the topology shown in FIG. 1.

The cloud server 102 can be used to provide at least one location specific service to the network device 104. For example, in some embodiments, the cloud server is configured to provide location based activation service to the network device 104. In some other embodiments, the cloud server is configured to provide a location based configuration service to the network device 104. In the embodiment depicted in FIG. 1, the cloud server 102 includes a device deployment module 110 configured to perform location based network device deployment for network devices (e.g., the network device 104) and a deployment database 112 configured to store deployment data. The cloud server may be implemented in hardware (e.g., circuits), software, firmware, or a combination thereof. In some embodiments, the cloud server is constructed on a server grade hardware platform, such as an x86 architecture platform. For example, the hardware platform of the cloud server may include conventional components of a computing device, such as one or more processors (e.g., CPUs), system memory, a network interface, storage system, and other I/O devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enables the cloud server to communicate with another device, such as the network device, the installer device 106, and/or the customer information portal 108, via a communication medium. The network interface may be one or more network adapters, also referred to as a Network Interface Card (NIC). In some embodiments, the storage system represents local storage devices (e.g., one or more hard disks, flash memory modules, solid state disks and optical disks) and/or a storage interface that enables the host to communicate with one or more network data storage systems. The storage system is used to store information, such as executable instructions, cryptographic keys, virtual disks, configurations and other data, which can be retrieved by the cloud server.

The network device 104 may be any type of suitable network device. The network device can be deployed in a customer site. For example, the network device may be designated to be deployed to a specific building, a specific floor within a building, and/or a specific location on a floor of a building. The network device may be fully or partially implemented as an Integrated Circuit (IC) device. In some embodiments, the network device is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, the network device may be compatible with Institute of Electrical and Electronics Engineers (IEEE) 802.3 protocol and/or one or more wireless local area network (WLAN) communications protocols, such as IEEE 802.11 protocol. In some embodiments, the network device is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as IEEE 802.11 protocol. In some embodiments, the network device is a wireless station (STA) that wirelessly connects to a wireless AP. For example, the network device may be a laptop, a desktop personal computer (PC), a mobile phone, or other wireless device that supports at least one WLAN communications protocol (e.g., IEEE 802.11)). In some embodiments, the network device is a wired communications device that is compatible with at least one wired local area network (LAN) communications protocol, such as a wired router (e.g., an Ethernet router), a wired switch (e.g., an Ethernet switch), or a wired bridge device (e.g., an Ethernet bridge).

The installer device 106 may be any type of suitable network device that is used by an installer or technician to facilitate the deployment of the network device 104. The installer device may be fully or partially implemented as an IC device. In some embodiments, the installer device is a wired communications device that includes at least one processor (e.g., a microcontroller, a DSP, and/or a CPU), at least one wired communications transceiver, and at least one wired communications interface and that supports at least one wired communications protocol. In some embodiments, the installer device is a wireless communications device that includes at least one wireless communications transceiver, at least one wireless communications interface, and/or at least one antenna and that supports at least one wireless communications protocol. In some embodiments, the installer device is a handheld wireless device, such as a cellular phone or a mobile phone (e.g., a smart phone), a pad computer, a Personal Digital Assistant (PDA) etc. that supports one or more radio frequency (RF) communications protocol, including without limitation, GSM, Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as IEEE 802.11 protocol.

The customer information portal 108 is configured to receive customer information. In some embodiments, the customer information portal includes a user interface that allows a customer to input information associated with a location specific service. For example, the user interface (e.g., a graphical user interface (GUI)) may allow a customer to input information associated with location based activation or configuration for one or more network devices (e.g., the network device 104). The customer information portal may be implemented in hardware (e.g., circuits), software, firmware, or a combination thereof.

Figure 2:
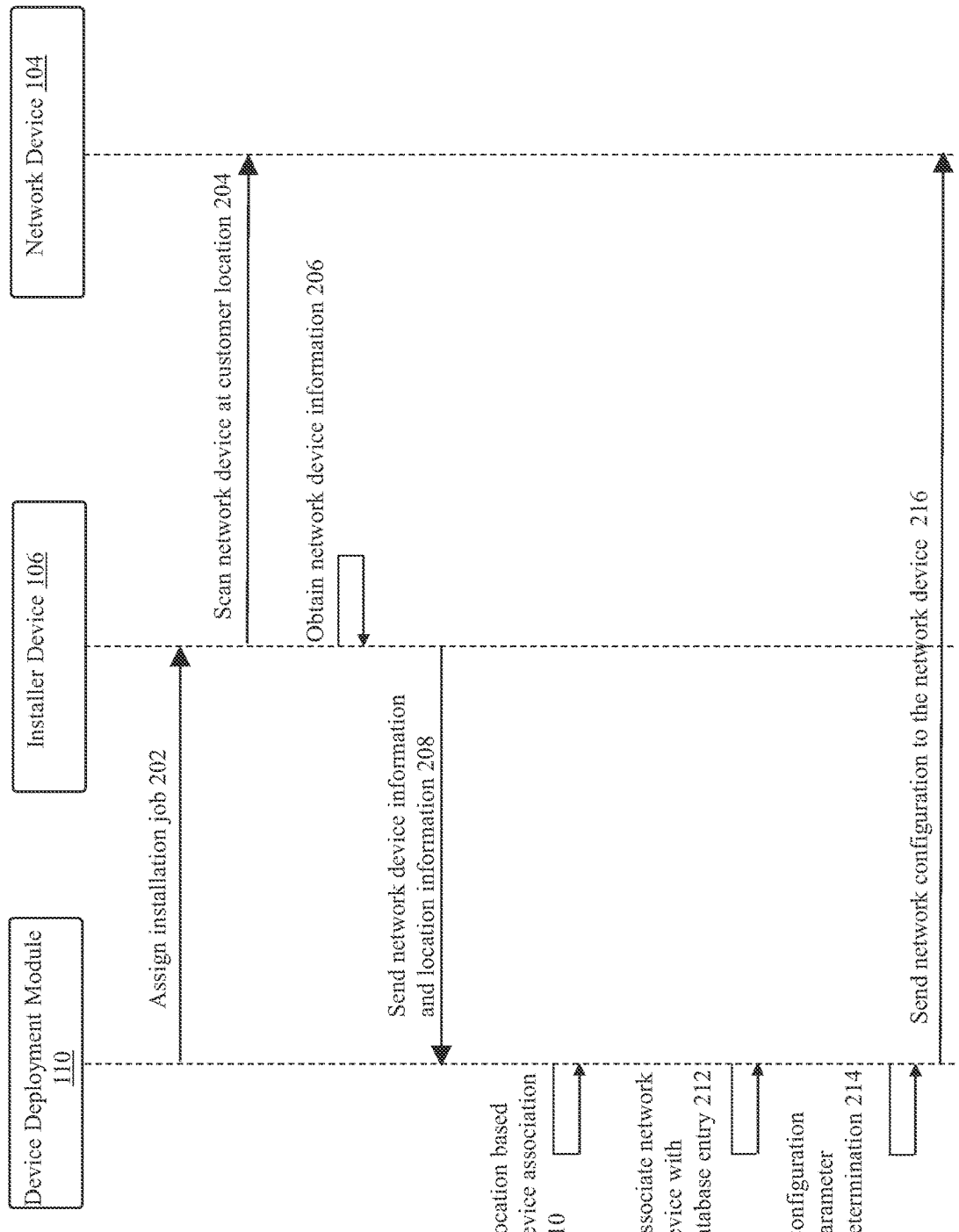
FIG. 2 shows a swim-lane diagram illustrating an example procedure for providing a location based service at the communications system depicted in FIG. 1.

FIG. 2 shows a swim-lane diagram illustrating an example procedure for providing a location based deployment at the communications system 100 depicted in FIG. 1. In this location based service provisioning procedure, the network device 104 is deployed at a customer site by an installer or technician using the installer device 106 and automatically configured by the device deployment module 110 of the cloud server 102.

In operation 202, the device deployment module 110 assigns an installation job to an installer or technician that uses the installer device 106. In some embodiments, the installer/technician uses a mobile application (app) that is installed in the installer device and is assigned the installation job via the mobile app. For example, the installer device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In an embodiment, an installation job that is assigned to the installer or technician includes detailed information related to a customer and network device deployment information. The detailed information related to a customer may include the name of the customer, site information of the customer, floor information of the customer, and/or the address of the customer. The network device deployment information may include a list of device(s) to be installed and device type(s), floor plan(s) and where a network device is to be installed in a floor plan, and/or a deployment topology that defines how network devices are connected to each other. One or more network devices to be installed are sent to a customer site. In some embodiments, there is no pre-population of device specific information (e.g., device serial number and/or media access control (MAC) address) of a network device to be installed in a central database when the network device to be installed is sent to a customer site. For example, the device deployment module 110 has no knowledge of specific information (e.g., device serial number and/or media access control (MAC) address) of a network device to be installed at a customer site before the network device is installed at the customer site.

In operation 204, the installer or technician uses the installer device 106 to scan the network device 104 at a customer site. In some embodiments, the installer or technician uses information in a mobile app installed in the installer device and scans the network device 104 at a customer location indicated by the mobile app. The installer or technician may use the installer device (e.g., a mobile app installed in the installer device) to scan a code (e.g., a QR code) of the network device 104. The code of the network device 104 may be on a surface of the network device 104 and/or on the packaging (e.g., the box or the wrapper) of the network device 104. For example, the code of the network device 104 may be stamped on, printed on, or attached to a surface of the network device 104 and/or on the packaging of the network device 104. The code of the network device 104 may be any suitable code that can be read (e.g., optically read) by the installer device 106, which may be a handheld device, such as a mobile phone or a tablet. For example, the code of the network device 104 may be a QR code or a two-dimensional (2D) barcode on the network device (e.g., printed on a housing of the device itself or printed on packaging of the network device). The code on the network device 104 (e.g., the QR code) may represent or contain the serial number of the network device, a device type of the network device, and/or MAC address information of the network device. In another example, the code of the network device 104 is a radio-frequency identification (RFID) tag or a Near-Field-Communication (NFC) tag that can be wirelessly read by the installer device 106.

Figure 3A:
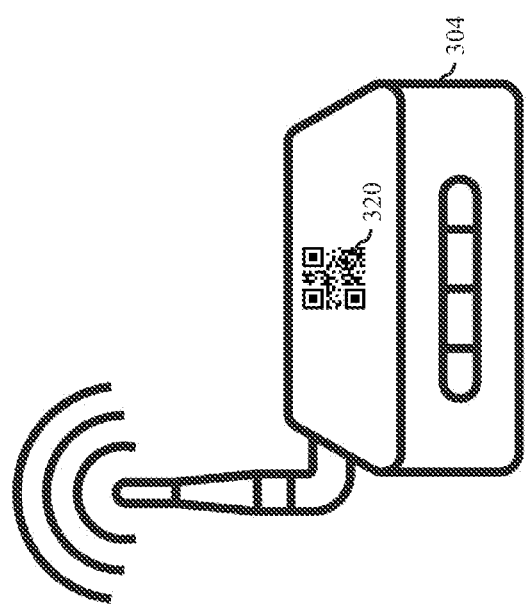
FIG. 3A depicts an embodiment of a wireless access point (AP) having a Quick Response (QR) code.

FIG. 3A depicts an embodiment of a wireless AP 304 having a QR code 320. The wireless AP 304 depicted in FIG. 3A is an embodiment of the network device 104 depicted in FIG. 1. However, the network device 104 depicted in FIG. 1 is not limited to the embodiment shown in FIG. 3A. In the embodiment depicted in FIG. 3A, the QR code 320 is on a surface of the wireless AP 304. For example, the QR code 320 is stamped on, printed on, or attached to a top surface, a bottom surface, and/or a side surface of the wireless AP 304. In some embodiments, the QR code 320 of the wireless AP 304 is on the packaging (e.g., the box or the wrapper) of the wireless AP 304. The installer or technician may use a mobile app installed in the installer device 106 to scan the QR code 320 on the wireless AP 304 to obtain the serial number of the wireless AP 304, a device type of the wireless AP 304, and/or MAC address information of the wireless AP 304. However, QR codes that can be used for the network device 104 are not limited to the embodiment depicted in FIG. 3A.

Figure 3B:
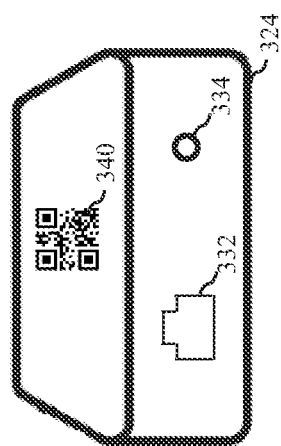
FIG. 3B depicts an embodiment of a wired network device having a QR code.

FIG. 3B depicts an embodiment of a wired network device 324 having a QR code 340. The wired network device 324 depicted in FIG. 3B is an embodiment of the network device 104 depicted in FIG. 1. However, the network device 104 depicted in FIG. 1 is not limited to the embodiment shown in FIG. 3B. In some embodiments, the wired communications device is a wired router (e.g., an Ethernet router), a wired switch (e.g., an Ethernet switch), or a wired bridge device (e.g., an Ethernet bridge). In the embodiment depicted in FIG. 3B, the QR code 340 is on a surface of the wired network device 324, which may include a communications port (e.g., an Ethernet port) 332 and a power connection port 334. For example, the QR code 340 is stamped on, printed on, or attached to a top surface, a bottom surface, and/or a side surface of the wired network device 324. In some embodiments, the QR code 340 of the wired network device 324 is on the packaging (e.g., the box or the wrapper) of the wired network device 324. The installer or technician may use a mobile app installed in the installer device 106 to scan the QR code 340 on the wired network device 324 to obtain the serial number of the wired network device 324, a device type of the wired network device 324, and/or MAC address information of the wired network device 324. However, QR codes that can be used for the network device 104 are not limited to the embodiment depicted in FIG. 3B.

Turning back to the swim-lane diagram shown in FIG. 2, in operation 206, the installer device 106 obtains information regarding the network device 104 based on a scan of the network device. For example, the installer device 106 obtains the serial number of the network device, a device type of the network device, and/or MAC address information of the network device based on a scanned QR code of the network device.

In operation 208, the installer device 106 transmits the information regarding the network device 104 that is obtained from a scan of the network device and location information of the network device 104 to the device deployment module 110 of the cloud server 102. Examples of location information of the network device 104 include without being limited to, address information in a map/navigation system, coordinate information in a map/navigation system, latitude and longitude information in a map/navigation system, and relative positional information in a map/navigation system. In some embodiments, the location information of the network device 104 includes one or more Global Positioning System (GPS) coordinates of the network device 104. In some embodiments, the installer device transmits the MAC address and the serial number of the network device and the customer information from a mobile app installed in the installer device that contains location information of the network device to the device deployment module.

In operation 210, the device deployment module 110 of the cloud server 102 performs location based device association on the network device 104. The device deployment module may dynamically associate the location information (e.g., GPS coordinates) for the network device 104 with the network specific information of the network device 104 without manual input. In some embodiments, the device deployment module associates the location information for the network device 104 with the MAC address and the serial number of the network device 104 and the location based device association of the network device 104 is achieved.

In operation 212, the device deployment module 110 of the cloud server 102 associates the network device 104 with a database entry in the deployment database 112 of the cloud server, which is also referred to as a planned deployment (PD) database. After the network device 104 is associated with the database entry in the deployment database, the network device 104 is activated. In some embodiments, the deployment database stores a list of network devices to be deployed at a customer site and detailed information related to the network devices, for example, device type information of the network devices and deployment topology information that defines how network devices are connected to each other.

Figure 4A:
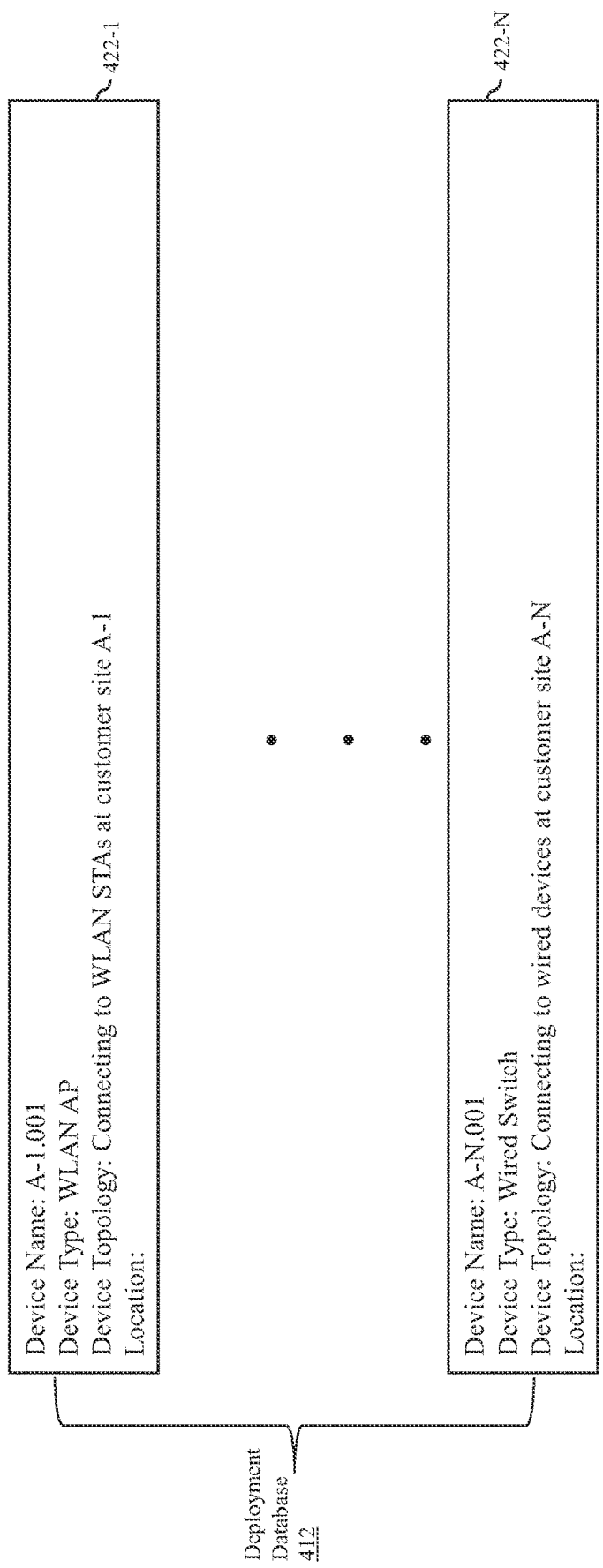
FIG. 4A depicts an embodiment of a deployment database of a cloud server of the communications system depicted in FIG. 1.

FIG. 4A depicts an embodiment of the deployment database 112 of the cloud server 102 of the communications system 100 depicted in FIG. 1. In the embodiment depicted in FIG. 4A, the deployment database 412 includes multiple database entries, 422-1, . . . , 422-N, where N is an integer greater than 1. Each of the database entries, 422-1, . . . , 422-N, includes device name information of a network device to be deployed at a customer site, device type information of the network device, and deployment topology information of the network device. In some embodiments, each database entry also includes a location tag or item, which is set to blank because a corresponding network device is not deployed to a customer site yet. For example, the database entry 422-1 includes device name information (A-1.001) of a network device to be deployed at a customer site A-1, device type information (e.g., WLAN AP) of the network device, deployment topology information (e.g., WLAN AP that connects to WLAN stations (STAs) (e.g., laptops, desktop personal computers (PCs), or other wireless devices that supports at least one WLAN communications protocol (e.g., IEEE 802.11) at the customer site A-1) of the network device, and a blank location tag. The database entry 422-N includes device name information (A-N.001) of a network device to be deployed at a customer site A-N, device type information (e.g., wired switch) of the network device, deployment topology information (e.g., wired switch that connects to wired devices at the customer site A-N) of the network device, and a blank location tag. A network device deployment database that is used in typical location specific service technology contains predefined configuration and network specific information (e.g., serial numbers and/or MAC addresses of the network devices) of network devices prior to shipping the network devices to a customer site. Compared to a network device deployment database that is used in typical location specific service technology, the deployment database 412 does not include device specific information (e.g., serial numbers and/or MAC addresses of the network devices) of network devices prior to shipping the network devices to a customer site. Based on scanning of network devices during installation, the device deployment module 110 can obtain device specific information (e.g., serial numbers and/or MAC addresses of the network devices) of network devices that are being installed and, subsequently, dynamically associate the location information for the network devices that are being installed with the network specific information of the network devices that are being installed. The deployment database 412 depicted in FIG. 4A is an embodiment of the deployment database 112 depicted in FIG. 1. However, the deployment database 112 depicted in FIG. 1 is not limited to the embodiment shown in FIG. 4A.

Figure 4B:
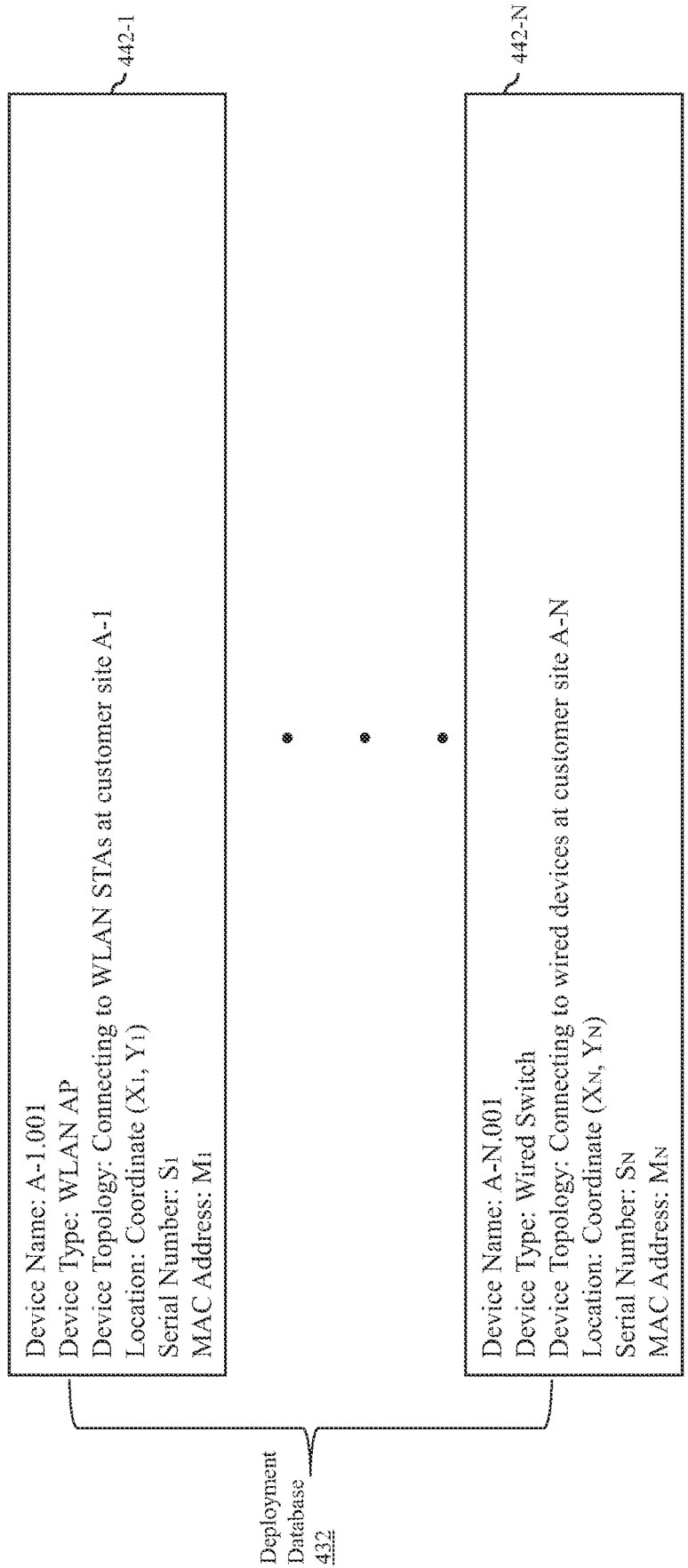
FIG. 4B depicts an embodiment of a deployment database with deployed device information of the cloud server of the communications system depicted in FIG. 1.

FIG. 4B depicts an embodiment of a deployment database 432 with deployed device information of the cloud server 102 of the communications system 100 depicted in FIG. 1. In the embodiment depicted in FIG. 4B, the deployment database 432 includes multiple database entries, 442-1, ..., 442-N, where N is an integer greater than 1. Each of the database entries, 442-1, ..., 442-N, includes device name information of a deployed network device at a customer site, device type information of the deployed network device, deployment topology information of the deployed network device, and location information of the deployed network device. In some embodiments, each database entry also includes device specific information of a deployed network device. The deployment database 432 may be generated based from the deployment database 412, for example, by expanding the deployment database 412 to include the actual installed location of a deployed network device and/or device specific information of a deployed network device. For example, the database entry 424-1 includes device name information (A-1.001) of a deployed network device at the customer site A-1, device type information (e.g., WLAN AP) of the deployed network device, deployment topology information (e.g., WLAN AP that connects to WLAN stations (STAs) at the customer site A-1) of the deployed network device, location information (e.g., coordinate (Xi, Yi)) of the deployed network device, the serial number, Si, of the deployed network device, and the MAC address, Mi, of the deployed network device. The database entry 422-N includes device name information (A-N.001) of a network device to be deployed at a customer site A-N, device type information (e.g., wired switch) of the network device, deployment topology information (e.g., wired switch that connects to wired devices at the customer site A-N) of the network device, location information (e.g., coordinate (XN, YN)) of the deployed network device, the serial number, $S_N$, of the deployed network device, and the MAC address, $M_N$, of the deployed network device. Based on scanning of network devices during installation, the device deployment module 110 can obtain the actual installed locations and device specific information (e.g., serial numbers and/or MAC addresses of the network devices) of network devices that are being installed and expand or update the deployment database 112. The deployment database 432 depicted in FIG. 4B may be an embodiment of the deployment database 112 depicted in FIG. 1. However, the deployment database 112 depicted in FIG. 1 is not limited to the embodiment shown in FIG. 4B.

Turning back to the swim-lane diagram shown in FIG. 2, in operation 214, once the network device 104 is activated, the device deployment module 110 of the cloud server 102 determines one or more configuration parameters for the network device 104 based on location information of the network device 104. In some embodiments, the device deployment module communicates with a configuration service to fetch or build a network configuration for the network device 104 based on location information of the network device 104. The location specific network configuration for the network device 104 may be determined by at least one location specific policy that is defined by a customer, for example, using the customer information portal 108. In some embodiments, when the QR code scan of the network device 104 is transmitted to the device deployment module, X,Y coordinates of the placement of the network device 104 on a floor plan is also transmitted to the device deployment module. The floor plan may be divided into different zones. Based on a combination of device type information and floor plan zone information, the device deployment module may determine an appropriate configuration for the network device 104. In some embodiments, configuration parameters for network devices in a specific zone within a floor plan are defined by a customer using the customer information portal. In operation 216, the device deployment module sends a location specific network configuration that is determined in operation 214 to the network device.

Typical location specific service technology require manual inputting of location information of a network device to provide a location based service to the network device. However, a manual deployment process is error prone and can lead to incorrect location data. In addition, there is no automated association of configuration based on location of a network device. In addition, location specific service technology typically uses a predefined configuration of a network device that is stored in a database prior to shipping the network device to a customer site to provide a location based service to the network device. For example, some companies provide Zero Touch Provisioning (ZTP) services by pre-populating network device serial numbers and mac addresses in a centralized database. When a network device is brought up to a customer site, the configuration for the network node is assigned to the network node based on location information stored in the centralized database, which is populated manually. In addition, there is no flexibility for any device to be shipped to any location unless the centralized database is updated first manually to reflect the accurate location of the device. For example, if the location of a wireless AP changes, the pre-established configuration for the wireless AP can be wrong. Compared to manual inputting of location information of network devices and using predefined configuration of network devices that is stored in a database prior to shipping network devices to a customer site, the device deployment module 110 of the cloud server 102 can automatically associate location information that corresponds to the actual installed location of a network device with a related configuration for providing location based services (e.g., location based deployment) to the network device. Based on scanning of network devices by the installer device 106 during installation, the device deployment module 110 can obtain network specific information (e.g., serial numbers and/or MAC addresses of the network devices) of network devices that are being installed and, subsequently, dynamically associate the location information that corresponds to the actual installed locations of the network devices that are being installed with the network specific information of the network devices that are being installed.

Figure 5:
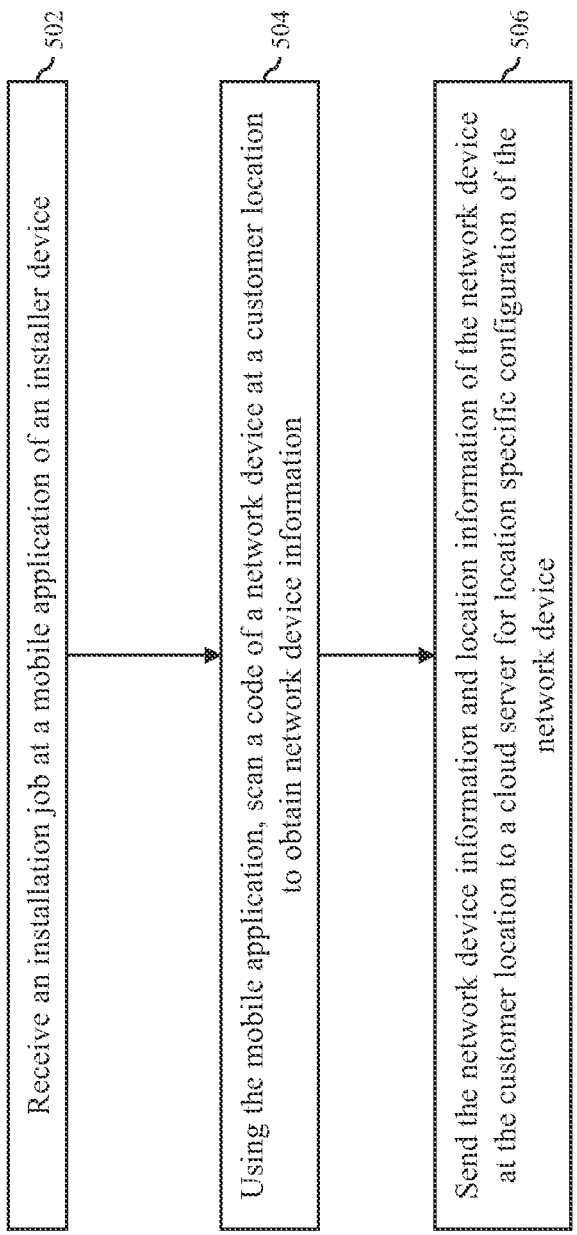
FIG. 5 is a process flow diagram of a method for network device deployment in accordance to an embodiment of the invention.

FIG. 5 is a process flow diagram of a method for network device deployment in accordance to an embodiment of the invention. According to the method, at block 502, an installation job is received at a mobile application of an installer device. In an embodiment, the installation job includes detailed information related to a customer and network device deployment information. The detailed information related to a customer may include the name of the customer, site information of the customer, floor information of the customer, and/or the address of the customer. The network device deployment information may include a list of device(s) to be installed and device type(s), floor plan(s) and where a network device is to be installed in a floor plan, and/or a deployment topology that defines how network devices are connected to each other. At block 504, using the mobile application, a code of a network device is scanned at a customer location to obtain network device information. At block 506, the network device information and location information (e.g., GPS coordinates) of the network device at the customer location is sent to a cloud server for location specific configuration of the network device. The operations 502-506 in the flow diagram of FIG. 5 may correspond to the operations 202-208 in the swim-lane diagram of FIG. 2. The network device may be similar to, the same as, or a component of network device 104 depicted in FIG. 1, the installer device may be similar to, the same as, or a component of the installer device 106 depicted in FIG. 1, and the cloud server may be similar to, the same as, or a component of the cloud server 102 depicted in FIG. 1.

Figure 6:
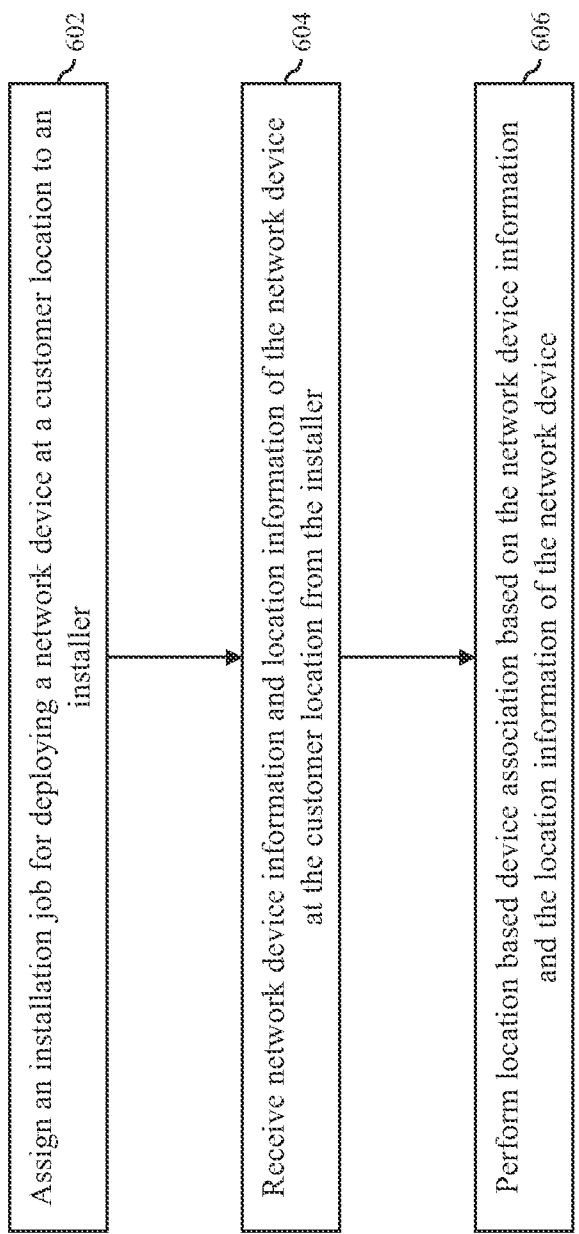
FIG. 6 is a process flow diagram of a method for network device deployment in accordance to another embodiment of the invention.

FIG. 6 is a process flow diagram of a method for network device deployment in accordance to another embodiment of the invention. According to the method, at block 602, an installation job for deploying a network device at a customer location is assigned to an installer. At block 604, network device information and location information of the network device at the customer location is received from the installer. At block 606, location based device association is performed based on the network device information and the location information of the network device. The operations 602-606 in the flow diagram of FIG. 6 may correspond to the operations 202, 208, 210 in the swim-lane diagram of FIG. 2. The network device may be similar to, the same as, or a component of network device 104 depicted in FIG. 1.

Figure 7:
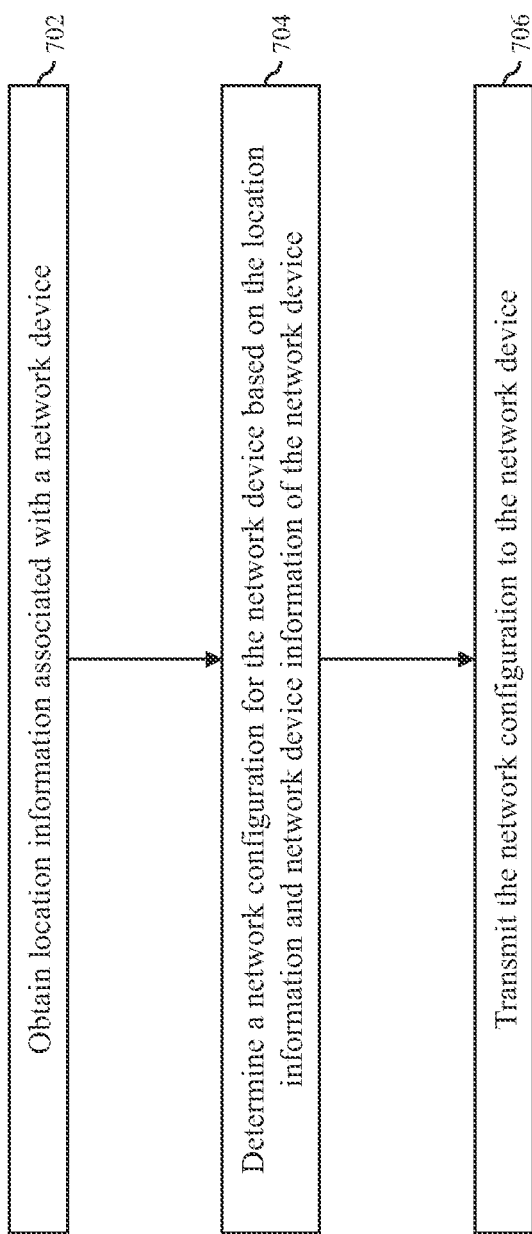
FIG. 7 is a process flow diagram of a method for providing a location based network configuration in accordance to an embodiment of the invention.

FIG. 7 is a process flow diagram of a method of providing a location based network configuration in accordance to an embodiment of the invention. According to the method, at block 702, location information associated with a network device is obtained, e.g., via association of GPS coordinates with a zone map. At block 704, a network configuration for the network device is determined based on the location information and network device information of the network device. At block 706, the network configuration is transmitted to the network device. The operations 702-706 in the flow diagram of FIG. 7 may correspond to the operations 214, 216 in the swim-lane diagram of FIG. 2. The network device may be similar to, the same as, or a component of network device 104 depicted in FIG. 1.

Figure 8:
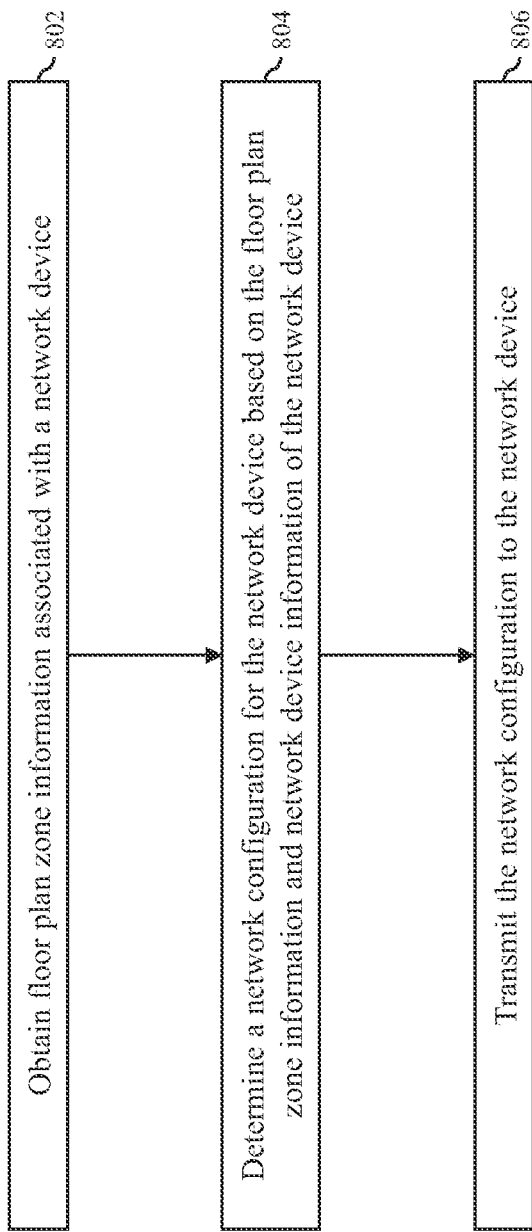
FIG. 8 is a process flow diagram of a method for providing a location based network configuration in accordance to an embodiment of the invention.

FIG. 8 is a process flow diagram of a method of providing a location based network configuration in accordance to an embodiment of the invention. According to the method, at block 802, floor plan zone information associated with a network device is obtained, e.g., via association of GPS coordinates with a zone map. At block 804, a network configuration for the network device is determined based on the floor plan zone information and network device information of the network device. At block 806, the network configuration is transmitted to the network device. The operations 802-806 in the flow diagram of FIG. 8 may correspond to the operations 214, 216 in the swim-lane diagram of FIG. 2. The network device may be similar to, the same as, or a component of network device 104 depicted in FIG. 1.

Figure 9:
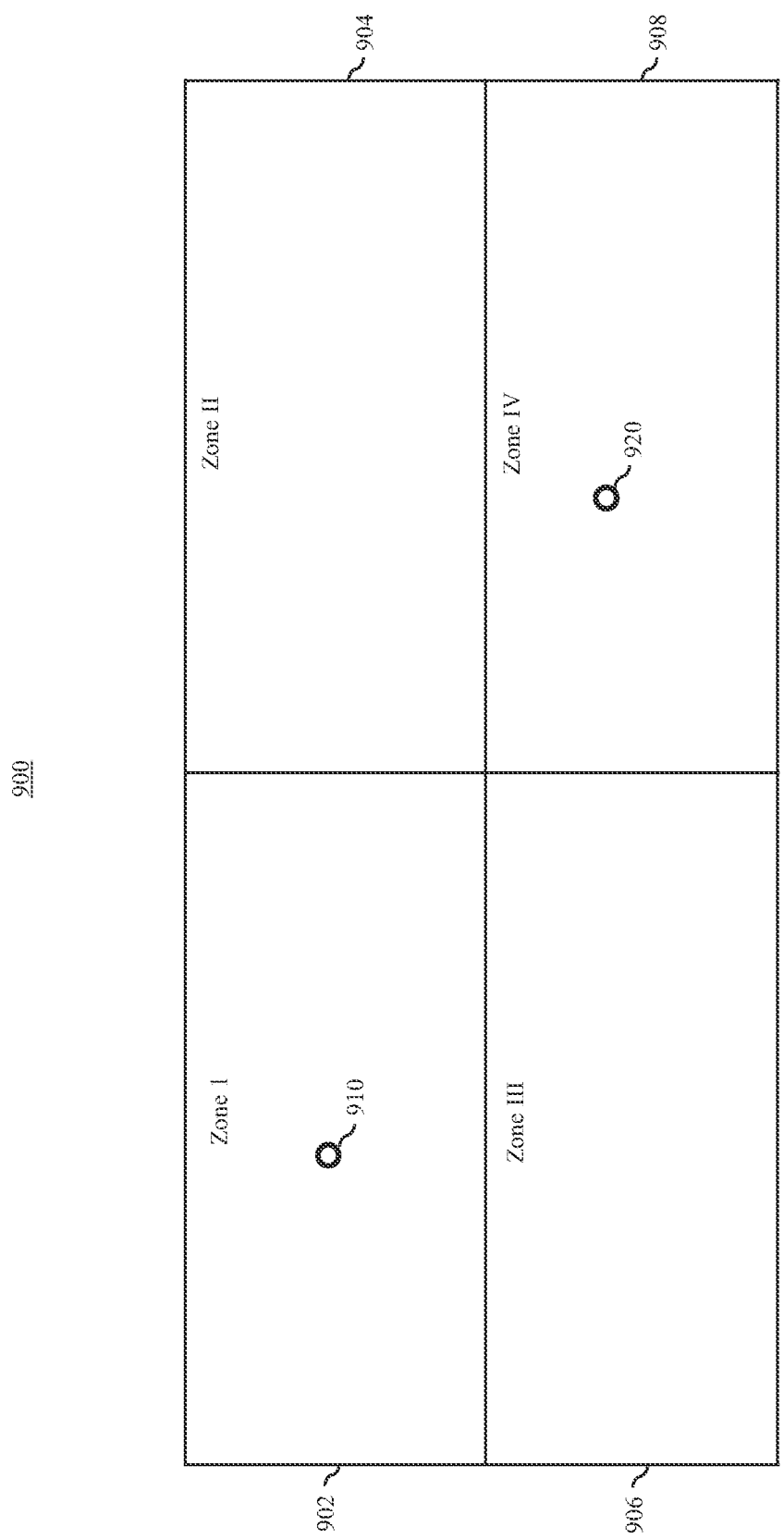
FIG. 9 depicts an embodiment of a floor plan with different zones in which a network device of the communications system depicted in FIG. 1 is deployed.

FIG. 9 depicts an embodiment of a floor plan 900 with different zones in which the network device 104 may be deployed. In the embodiment depicted in FIG. 9, the floor plan 900 of a customer site includes four zones 902, 904, 906, 908. However, a floor plan to deploy the network device 104 is not limited to the embodiment depicted in FIG. 9. A coordinate 910 in the floor plan 900 is located within Zone I 902 while a coordinate 920 in the floor plan 900 is located within Zone IV 908. Based on a combination of network device information (e.g., device type information) and floor plan zone information of the network device, the device deployment module 110 determines an appropriate configuration for the network device 104. For example, when the network device is deployed at the coordinate 910, a first configuration is determined the network device, and while when the network device is deployed at the coordinate 920, a second configuration is determined the network device. In one example, Zone I 902 is a lobby of a customer site, Zone II 904 is a conference room of the customer site, Zone III 906 is an accounting department of the customer site, and Zone IV 908 is an engineering department of the customer site. Each of Zone I 902, Zone II 904, Zone III 906, and Zone IV 908 has different wireless AP access needs, and thus, corresponds to location-specific wireless AP access rules. For example, Zone I 902 is assigned configuration A, Zone II 904 is assigned configuration B, Zone III 906 is assigned configuration C, and Zone IV 908 is assigned configuration D.

Figure 10:
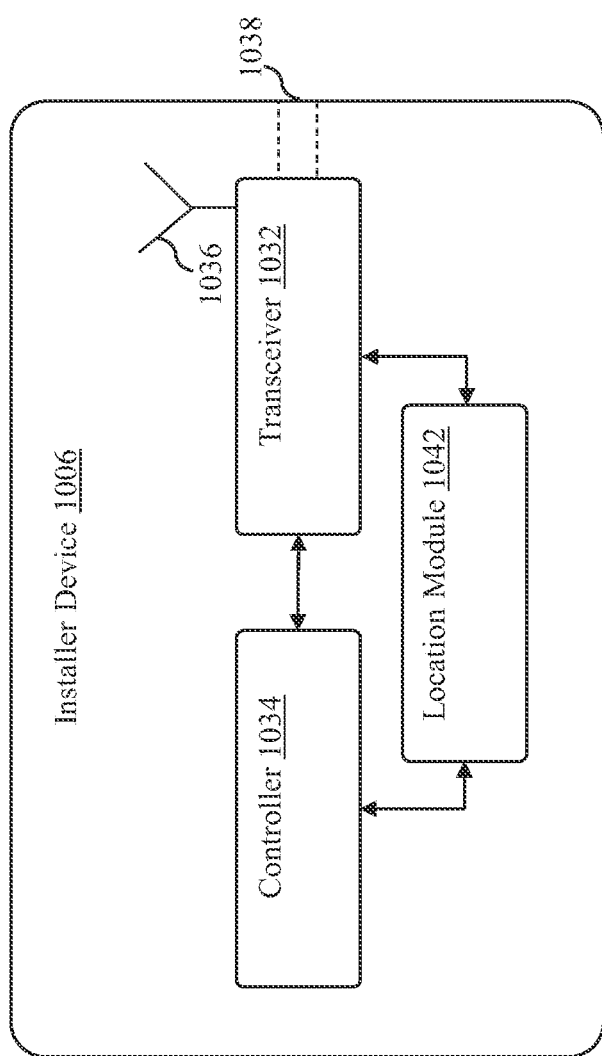
FIG. 10 depicts an embodiment of an installer device of the communications system depicted in FIG. 1.

FIG. 10 depicts an embodiment of an installer device 1006 of the communications system 100 depicted in FIG. 1. The installer device 1006 depicted in FIG. 10 is an embodiment of the installer device 106 depicted in FIG. 1. However, the installer device 106 depicted in FIG. 1 are not limited to the embodiment depicted in FIG. 10. In the embodiment depicted in FIG. 10, the installer device 1006 includes a wireless and/or wired transceiver 1032, a controller 1034 (e.g., a microcontroller, a DSP, and/or a CPU) operably connected to the transceiver 1032, at least one antenna 1036 operably connected to the transceiver 1032, at least one optional network port 1038 operably connected to the transceiver 1032, and a location module 1042. In some embodiments, the installer device 1006 is a handheld wireless device, such as a cellular phone or a mobile phone (e.g., a smart phone), a pad computer, a Personal Digital Assistant (PDA) etc. that supports one or more RF communications protocols. In some embodiments, the transceiver 1032 includes a physical layer (PHY) device. The transceiver 1032 may be any suitable type of transceiver. For example, the transceiver 1032 may be a short-range communications transceiver (e.g., a Bluetooth) or a LAN transceiver (e.g., a transceiver compatible with an IEEE 802.11 protocol). In some embodiments, the installer device 1006 includes multiple transceivers, for example, a short-range communications transceiver (e.g., a Bluetooth) and a LAN transceiver (e.g., a transceiver compatible with an IEEE 802.11 protocol). The controller 1034 may be configured to control the transceiver 1032 to process to process packets received through the antenna 1036 and/or the network port 1038 and/or to generate outgoing packets to be transmitted through the antenna 1036 and/or the network port 1038. The antenna 1036, which may be optional in some implementations, may be any suitable type of antenna. For example, the antenna 1036 may be an induction type antenna such as a loop antenna or any other suitable type of induction type antenna. However, the antenna 1036 is not limited to an induction type antenna. The network port 1038 may be any suitable type of port. For example, the network port 1038 may be a local area network (LAN) network port such as an Ethernet port. However, the network port 1038 is not limited to LAN network ports. The location module 1042 is configured to determine or obtain location information of the installer device or a device that is associated with (e.g., connected with or in the vicinity of) the installer device. Examples of location information that can be determined or obtained by the location module 1042 include without being limited to, address information in a map/navigation system, coordinate information in a map/navigation system, latitude and longitude information in a map/navigation system, and relative positional information in a map/navigation system. In some embodiments, the location information that can be determined or obtained by the location module 1042 includes one or more X, Y coordinates and/or Global Positioning System (GPS) coordinates or other global or satellite location system coordinates. In some embodiments, the location module 1042 is a GPS or other global or satellite location system module that includes a GPS receiver or other global or satellite. In some embodiments, the location module 1042 uses location techniques such as triangulation or in-door beacon based location technique to determine or obtain location information of the installer device or a device that is associated with (e.g., connected with or in the vicinity of) the installer device.

Figure 11:
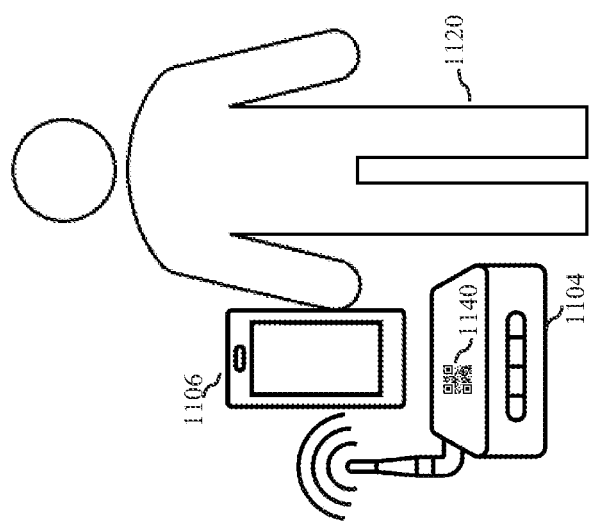
FIG. 11 depicts an installer or a technician having an installer device scanning a QR code of a wireless device (e.g., a wireless AP).

FIG. 11 depicts an installer or a technician 1120 having an installer device 1106 scanning a QR code 1140 of a wireless device (e.g., a wireless AP) 1104. The wireless device 1104 depicted in FIG. 11 may be an embodiment of the network device 104 depicted in FIG. 1, while the installer device 1106 depicted in FIG. 11 may be an embodiment of the installer device 106 depicted in FIG. 1 (e.g., the installer device 1006 depicted in FIG. 10). However, the network device 104 and the installer device 106 depicted in FIG. 1 are not limited to the embodiment shown in FIG. 11. In the embodiment depicted in FIG. 11, the QR code 1140 is on a surface of the wireless device 1104. For example, the QR code 1140 is stamped on, printed on, or attached to a top surface, a bottom surface, and/or a side surface of the wireless device 1104. In some embodiments, the QR code 1140 of the wireless device 1104 is on the packaging (e.g., the box or the wrapper) of the wireless device 1104. The installer or technician 1120 may use a mobile app installed in the installer device 1106, which may be a handheld device, such as a mobile phone or a tablet, to scan the QR code 1140 on the wireless device 1104 to obtain information related to the wireless device 1104. In some embodiments, the information related to the wireless device 1104 includes the serial number of the wireless device 1104, a device type of the wireless device 1104, and/or MAC address information of the wireless device 1104. However, QR codes that can be used for the network device 104 are not limited to the embodiment depicted in FIG. 11. During the scan of the QR code 1140 of the wireless device 1104, the installer device 1106 obtains the location of the wireless device 1104, which may include one or more X, Y coordinates and/or Global Positioning System (GPS) coordinates or other global or satellite location system coordinates. In some embodiments, the installer device 1106 uses a location module, which may be a GPS receiver or other global or satellite receiver, to obtain the location of the wireless device 1104.

Figure 12:
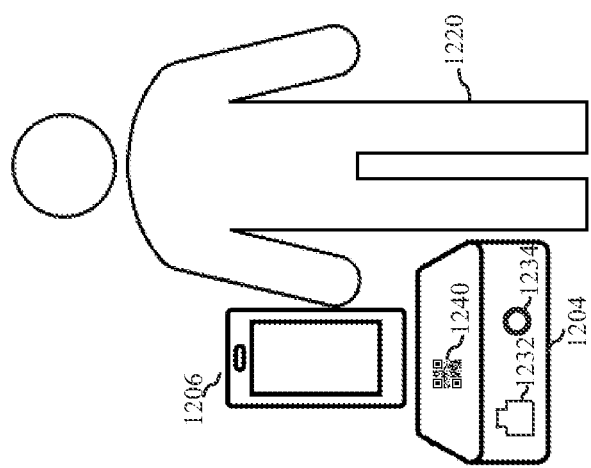
FIG. 12 depicts an installer or a technician having an installer device scanning a QR code of a wired network device.

FIG. 12 depicts an installer or a technician 1220 having an installer device 1206 scanning a QR code 1240 of a wired network device 1204. The wired network device 1204 depicted in FIG. 12 may be an embodiment of the network device 104 depicted in FIG. 1, while the installer device 1206 depicted in FIG. 12 may be an embodiment of the installer device 106 depicted in FIG. 1. However, the network device 104 and the installer device 106 depicted in FIG. 1 are not limited to the embodiment shown in FIG. 12. In some embodiments, the wired communications device is a wired router (e.g., an Ethernet router), a wired switch (e.g., an Ethernet switch), a wired bridge device (e.g., an Ethernet bridge), or a wired hub. In the embodiment depicted in FIG. 12, the QR code 1240 is on a surface of the wired network device, which may include a communications port (e.g., an Ethernet port) 1232 and a power connection port 1234. For example, the QR code 1240 is stamped on, printed on, or attached to a top surface, a bottom surface, and/or a side surface of the wired network device. In some embodiments, the QR code 1240 of the wired network device is on the packaging (e.g., the box or the wrapper) of the wired network device. The installer or technician may use a mobile app installed in the installer device 1206, which may be a handheld device, such as a mobile phone or a tablet, to scan the QR code 1240 on the wired network device to obtain the serial number of the wired network device, a device type of the wired network device, and/or MAC address information of the wired network device. However, QR codes that can be used for the network device 104 are not limited to the embodiment depicted in FIG. 12. During the scan of the QR code 1240 of the wired network device, the installer device 1206 obtains the location of the wired network device, which may include one or more X, Y coordinates and/or Global Positioning System (GPS) coordinates or other global or satellite location system coordinates. In some embodiments, the installer device 1206 uses a location module, which may be a GPS receiver or other global or satellite receiver, to obtain the location of the wired network device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network device deployment, the method comprising:
   receiving an installation job at a mobile application of an installer device;
   using the mobile application, scanning a code of a network device at a customer location to obtain network device information, wherein a serial number of the network device and media access control (MAC) address information of the network device are not stored at a database of a cloud server prior to scanning the code of the network device at the customer location; and
   sending the network device information and location information of the network device at the customer location to the cloud server for network device activation and location specific configuration of the network device, wherein once the network device is activated, the cloud server determines one or more configuration parameters for the network device based on a combination of device type information and floor plan zone information of the network device and at least one user-defined location specific policy, wherein prior to shipping the network device to the customer location and prior to installing the network device at the customer location, a deployment database does not include device specific information, which includes the serial number and the MAC address information of the network device, wherein based on scanning of the network device during installation, the location information of the network device is dynamically associated with the device specific information, which includes the serial number of the network device and the MAC address information of the network device, at the cloud server after scanning the code of the network device at the customer location, wherein the cloud server has no knowledge of the device specific information, which includes the serial number of the network device and the MAC address information of the network device, before the network device is installed at the customer location, and wherein the cloud server stores device name information of the network device, device type information of the network device, deployment topology information of the network device, the location information of the network device, the serial number of the network device, and the MAC address information of the network device in an entry of the deployment database after the network device is installed at the customer location.

2. The method of claim 1, wherein the code of the network device comprises a two-dimensional (2D) barcode on a surface of the network device or on a packaging of the network device.

3. The method of claim 2, wherein the 2D barcode on the network device comprises a Quick Response (QR) code on the network device.

4. The method of claim 3, wherein the QR code on the network device contains at least one of the serial number of the network device, a device type of the network device, and the MAC address information of the network device.

5. The method of claim 1, wherein the installer device comprises a mobile phone.

6. The method of claim 1, wherein the network device comprises a wireless communications device that is compatible with a wireless local area network (WLAN) communications protocol.

7. The method of claim 6, wherein the wireless communications device comprises a wireless access point (AP).

8. The method of claim 1, wherein the network device comprises a wired communications device that is compatible with a wired local area network (LAN) communications protocol.

* * * * *